(12) United States Patent
Sprague et al.

(10) Patent No.: US 9,030,374 B2
(45) Date of Patent: May 12, 2015

(54) COMPOSITE DISPLAY MODULES

(75) Inventors: Robert A. Sprague, Saratoga, CA (US);
Bryan Hans Chan, San Francisco, CA (US)

(73) Assignee: E Ink California, LLC, Fremont, CA (US)

( * ) Notice: Subject to any disclaimer, the term of this patent is extended or adjusted under 35 U.S.C. 154(b) by 1017 days.

(21) Appl. No.: 13/100,552

(22) Filed: May 4, 2011

(65) Prior Publication Data

US 2011/0273363 A1   Nov. 10, 2011

Related U.S. Application Data

(60) Provisional application No. 61/332,129, filed on May 6, 2010.

(51) Int. Cl.
*G02F 1/1333* (2006.01)

(52) U.S. Cl.
CPC ........ *G02F 1/13336* (2013.01); *G09G 2380/04* (2013.01)

(58) Field of Classification Search
CPC .... G06F 3/1423; G06F 3/1431; G06F 3/1446
USPC .................................................... 345/1.1–1.3
See application file for complete search history.

(56) References Cited

U.S. PATENT DOCUMENTS

| | | | |
|---|---|---|---|
| 6,930,818 B1 | 8/2005 | Liang et al. | |
| 2004/0169912 A1* | 9/2004 | Liang et al. | 359/296 |
| 2005/0269952 A1* | 12/2005 | Kim | 313/512 |
| 2006/0228532 A1* | 10/2006 | Sun et al. | 428/195.1 |

FOREIGN PATENT DOCUMENTS

WO   WO 2001/067170   9/2001

OTHER PUBLICATIONS

Allen, K. (Oct. 2003). Electrophoretics Fulfilled. *Emerging Displays Review: Emerging Display Technologies, Monthly Report—Oct. 2003*, 9-14.
Bardsley, J.N. & Pinnel, M.R. (Nov. 2004) Microcup™ Electrophoretic Displays, *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTO News & Letters*, 102, 37-41. (in Chinese, English abstract attached).

(Continued)

*Primary Examiner* — Kimnhung Nguyen
(74) *Attorney, Agent, or Firm* — Perkins Coie LLP

(57) ABSTRACT

The present invention provides composite display modules which have reduced visible dead space between display modules. This is of particular interest for the price rail, where it is desirable to achieve a long (about 3-4 ft) section of an active module. The present invention is directed to a composite display module comprising: (a) more than one single display module, wherein said single display modules are not edge-sealed and they are mounted on a single back support structure and are kept tightly close to each other right up to their edges; and (b) said composite display module is edge sealed.

8 Claims, 11 Drawing Sheets

(56) References Cited

OTHER PUBLICATIONS

Chen, S.M. (May 2003) The New Application and the Dynamics of Companies. *TRI.* 1-10. (In Chinese, English abstract attached).

Chung, J., Hou, J., Want, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Lables & Indicators.* Presentation conducted at Smart Paper Conference Nov. 15-16, 2006, Atlanta, GA, USA.

Ho, C., & Liang, R.C. (Dec. 2003). *Microcup® Electronic Paper by Roll-to-Roll Manufacturing Processes.* Presentation conducted at FEG, Nei-Li, Taiwan.

Ho, Candice. (Feb. 1, 2005) *Microcupt® Electronic Paper Device and Application.* Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liong, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes.* Presentation conducted at the Flexible Microelectronics & Displays conference of U.S. Display Consortium, Phoenix, Arizona, USA.

Liang, R.C. (Apr. 2004). *Microcup Electronic Paper by Roll-to-Roll Manufacturing Process.* Presentation at the Flexible Displays & Electronics 2004 of Intertech, San Francisco, California, USA.

Liang, R.C. (Oct. 2004) *Flexible and Roll-able Displays/Electronic Paper—A Technology Overview.* Paper presentated at the METS 2004 Conference in Taipie, Taiwan.

Liang, R.C., & Tseng, S. (Feb. 2003). *Microcup® LCD, A New Type of Dispersed LCD by A Roll-to-Roll Manufacturing Process.* Paper presented at the IDMC, Taipei, Taiwan.

Liang, R.C., (Feb. 2005) *Flexible and Roll-able Displays/Electronic Paper—A Brief Technology Overview.* Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by A Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays.* Paper presented at the IDMC, Taipei, Taiwan.

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-626.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophoretic Display.* The Flexible Microelectronics & Displays Conference of U.S. Display Consortium.

Wang, X., Zang, H.M. and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process.* Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes.* Presentation conducted at the Advisory Board Meeting, Bowling Green State University, Ohio, USA.

Zang, H.M. (Feb. 2004). *Microcup Electronic Paper.* Presentation conducted at the Displays & Microelectronics Conference of U.S. Display Consortium, Phoenix, Arizona, USA.

Zang, H.M. (Sep. 2006) *Monochrome and Area Color Microcup® EPDs by Roll-to-Roll Manufacturing Process.* Presentation conducted at the Fourth Organic Electronics Conference and Exhibition (OEC-06), Sep. 25-27, 2006, Frankfurt, Germany.

Zang, H.M. (Feb. 2007) *Developments in Microcup® Flexible Displays.* Presentation conducted at the 6th Annual Flexible Display and Microelectronics Conference, Phoenix, AZ Feb. 6-8.

Zang, H.M., & Liang, R.C. (2003) Microcup Electronic Paper by Roll-to-Roll Manufacturing Processes. *The Spectrum*, 16(2), 16-21.

Zang, H.M., Wang, F., Kang, Y.M., Chen, Y. and Lin, W. (Jul. 2007) *Microcup® e-Paper for Embedded and Flexible Designs.* IDMC'07, Taipei International Convention Center, Taiwan.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

\* cited by examiner

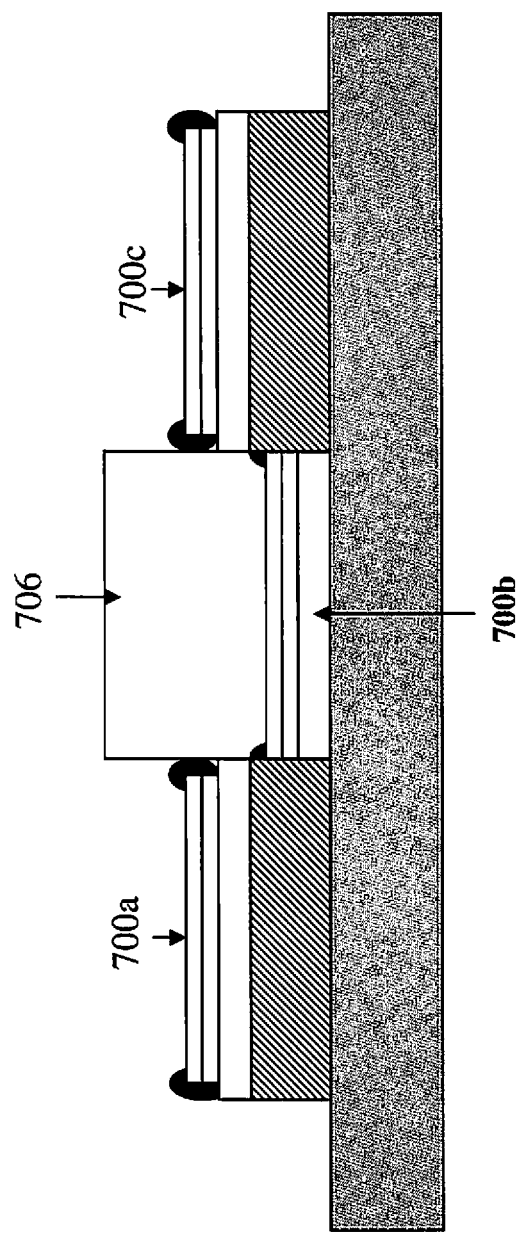

Single Module

COMPOSITE DISPLAY MODULES

This application claims priority to U.S. Provisional Application No. 61/332,129, filed May 6, 2010; the content of which is incorporated herein by reference in its entirety.

FIELD OF THE INVENTION

The present invention is directed to composite display modules which are particularly suitable to be used as a price rail.

BACKGROUND OF THE INVENTION

Because of the lack of large size backplane, it is not possible currently to manufacture a large size display module in one piece. Therefore, when a large-size display module is required, the only solution is to piece smaller size modules together. However a major obstacle to this approach is the gaps between the active image area on one module and the active image area on a neighboring module. The reason for this gap may be two folds, one of which is the cutting tolerance required for the backplane and the other is the edge sealing required to protect the integrity of the module. The inactive gap may be as wide as 4 mm. As a result, if two modules are placed next to each other, there could be an inactive gap of as wide as 8 mm, which is highly undesirable.

SUMMARY OF THE INVENTION

A first aspect of the invention is directed to a composite display module which comprises
  (a) more than one single display module wherein said single display modules are not edge-sealed and they are mounted on a single back support structure and are kept tightly close to each other right up to their edges; and
  (b) said composite display module is edge sealed.

A second aspect of the invention is directed to a composite display module which comprises more then one already edge sealed single display module mounted on a single back support structure wherein the ends of said already edge sealed display modules are aligned and overlapped with each other and the angle between the surface of the single back support structure and the single display module is dependent on the thickness and the length of the single display module.

A third aspect of the invention is directed to a composite display module which comprises at least one single display module which is mounted on an elevation panel and at least one single display module which is not mounted on an elevation panel and the ends of all of the single display modules are aligned and overlapped with each other. In one embodiment, the composite display module further comprises an optical compensation window mounted on top of the single display modules which are not on the elevation panel.

In one embodiment, the composite module further comprises a single barrier layer. In one embodiment, each of said display modules comprises a common electrode layer, a display panel and a backplane.

In one embodiment, the display panel comprises display cells filled with an electrophoretic fluid.

In one embodiment, the composite display module has a one dimensional design. In another embodiment, the composite display module has a two dimensional design.

The present invention provides composite display modules which have reduced visible dead space between display modules. This is of particular interest for a price rail, where it is desirable to achieve a long (about 3-4 ft) section of an active module.

BRIEF DISCUSSION OF THE DRAWINGS

FIGS. 7a-7b illustrate an optical compensation window in a composite display module.

DETAILED DESCRIPTION OF THE INVENTION

Figure 1:
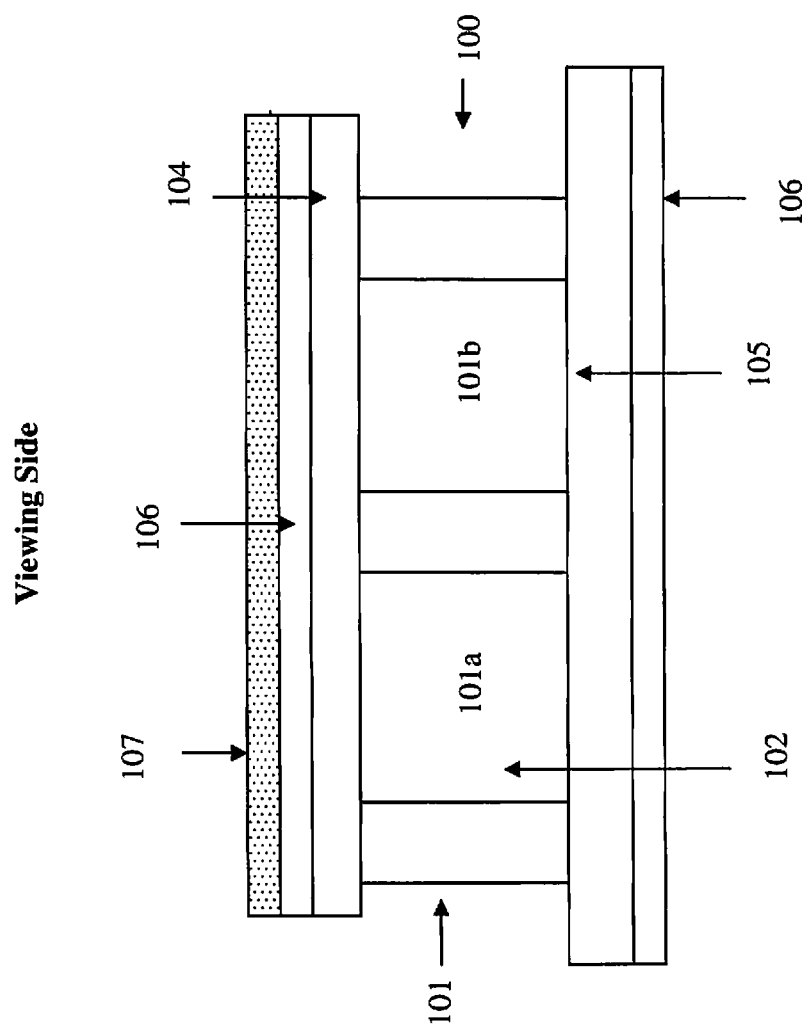
FIG. 1 depicts a single display module in general.

FIG. 1 illustrates a display module (100). The display module comprises a display panel (101) which is sandwiched between two electrode layers (104 and 105). For brevity, the structure comprising a display panel and two electrode layers as shown in FIG. 1 is collectively referred to as a "display module", throughout the application.

The display panel (101) may comprise a plurality of display cells (e.g., 101a and 101b) filled with a display fluid (102). The term "display cell" is intended to refer to a microcontainer which is individually filled with a display fluid. Examples of "display cell" include, but are not limited to, microcups, microcapsules, micro-channels, other partition-typed display cells and equivalents thereof.

In one embodiment, the display fluid may be an electrophoretic fluid comprising charged pigment particles dispersed in a solvent or solvent mixture. The electrophoretic fluid may be a system comprising one or two types of particles.

The display modules used in the present invention may include a variety of known displays, such as, liquid crystal display, LED, electroferometric display, electrowetting display, micro mems and the like.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers.

The patterned segment electrode layer (in a segment display device) or the thin film transistor pixel electrodes (in an active matrix display device) may be referred to as a "backplane", which along with the common electrode drives the display device. In FIG. 1, the electrode layers 104 and 105 may be a common electrode layer and a backplane, respectively.

The electrode layers may be formed on a substrate layer (106) [(such as polyethylene terephthalate (PET)]. The substrate layer may also be a glass layer.

There may also be adhesive and sealing layers between the backplane (105) and the display panel (101).

In a packaged display module, there may be a barrier layer (107) on the viewing side to protect the module.

Figure 2A:
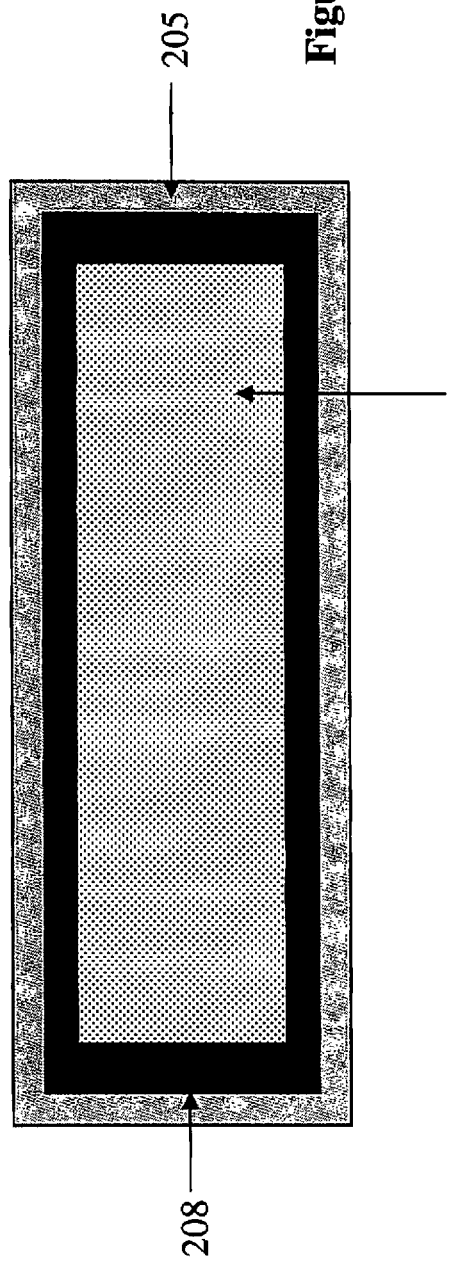
FIGS. 2a and 2b are a top view and a cross-sectional view, respectively, of a display module which is packaged.
Figure 2B:
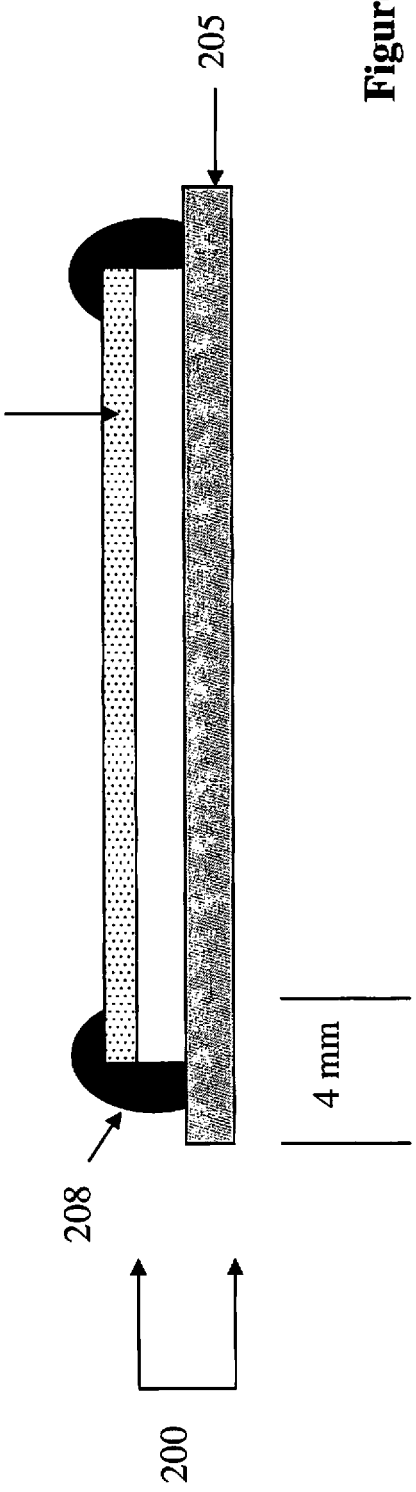
Figure 3:
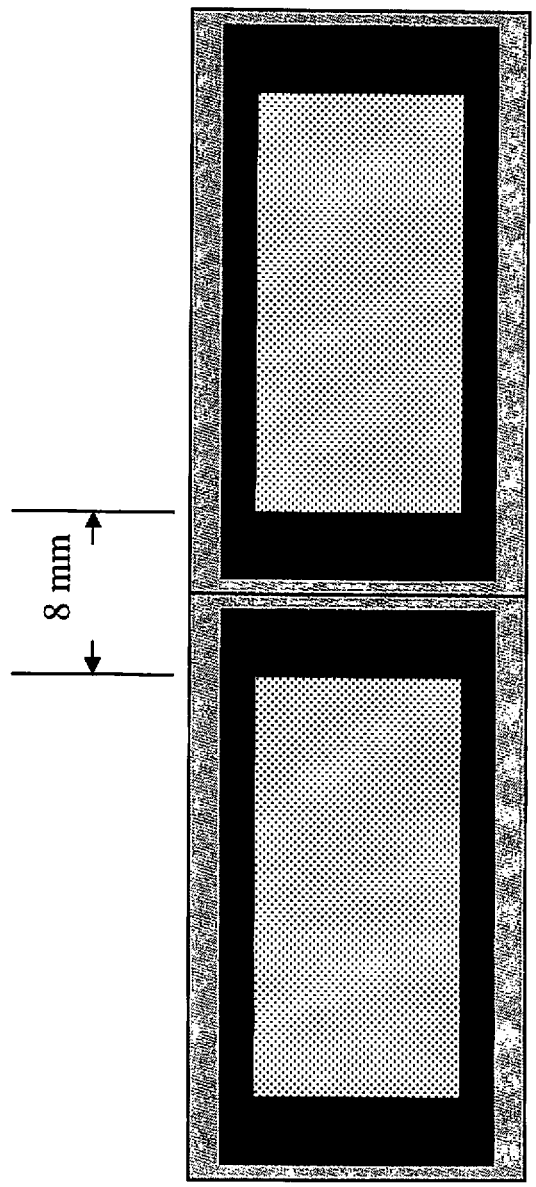
FIG. 3 shows two display modules tiled together.

FIGS. 2a and 2b show a top view and a cross sectional view, respectively, of a display module of FIG. 1 which is packaged. There is a barrier layer (207) on top of the module 200, on the viewing side. An edge seal material (208) is used to cover the edges of the display module, in order to reduce penetration of moisture and/or oxygen into the module. The backplane (205) in the module extends beyond the edge seal (208) to allow for cutting tolerance. This leads to an inactive border of, for example, about 4 mm in width. In this case, when two pieces of such a module are tiled together, there would be an inactive region of about 8 mm in width between the two neighboring active regions, as shown in FIG. 3.

In the description below, the display module formed from more than one single piece of display module is referred to as a composite display module.

Figure 4A:
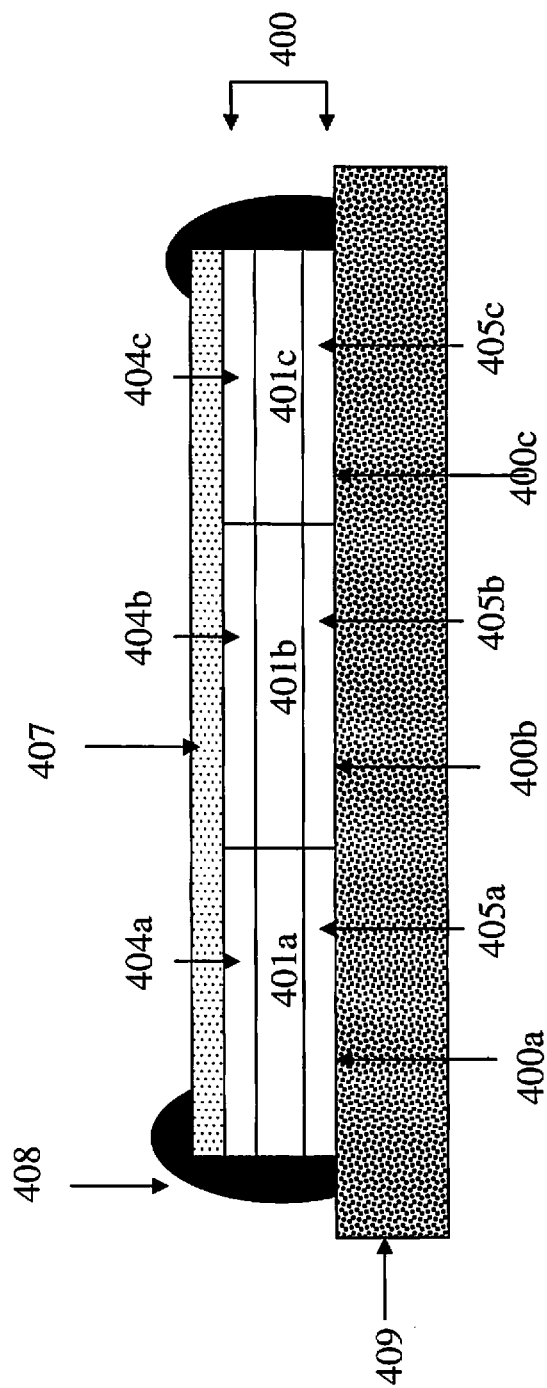
FIGS. 4a-4c illustrate one composite display module of the present invention.
Figure 4B:
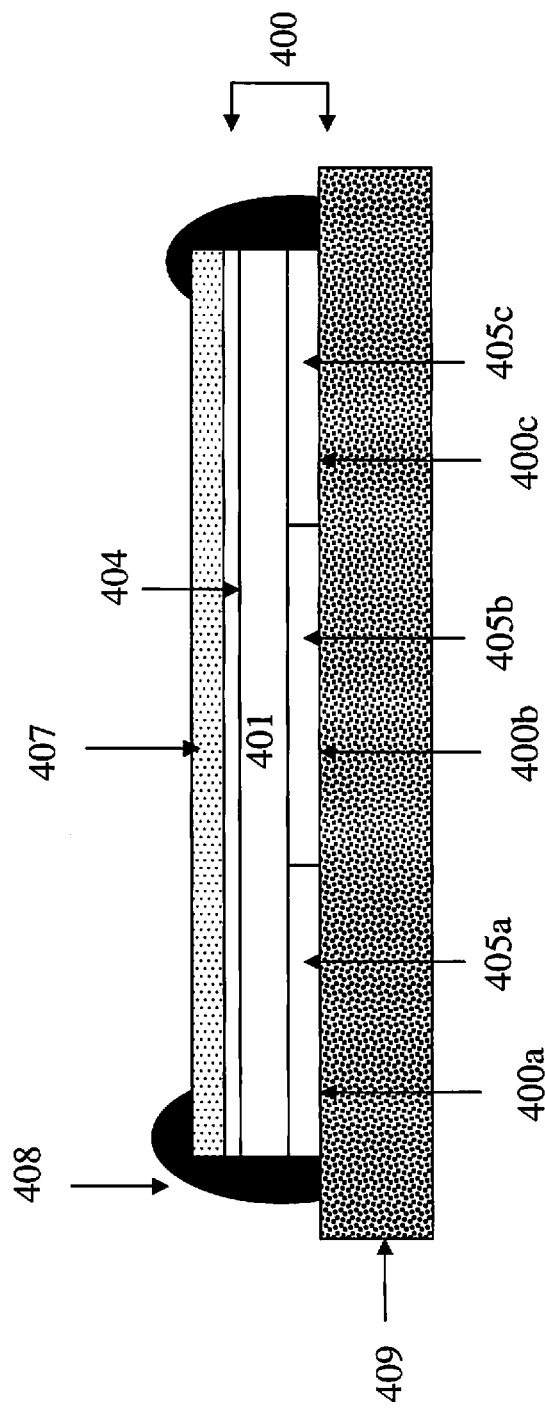
Figure 4C:
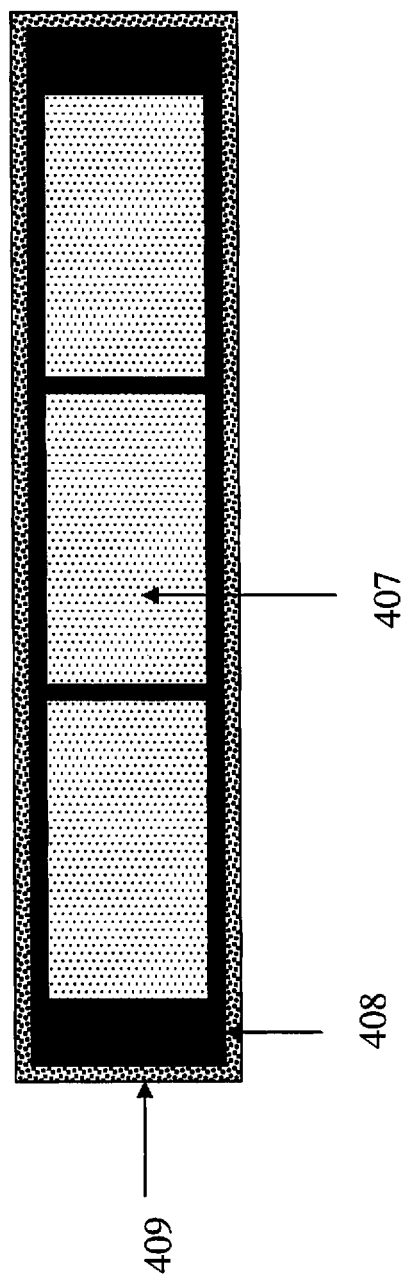

FIGS. 4a-4c illustrate one version of the composite display module of the present invention. FIGS. 4a and 4b are the cross-sectional view and FIG. 4c is the top view.

As shown in FIG. 4a, there is a single back support structure (409) in the composite display module and mounted on top of the back support structure are single display modules (400a, 400b & 400c). The single modules are placed as close to each other as possible, right up to their edges. A single barrier layer (407) is laminated across all the single modules. An edge seal material (408) extends all the way around the edge from the top of the barrier layer (407) down to the back support structure (409), covering the edges of the barrier layer (407) and the modules (400a, 400b & 400c).

It is also shown in this figure that each of the single modules has a backplane (405a, 405b & 405c), a display panel (401a, 401b & 401c) and a common electrode layer (404a, 404b & 404c).

FIG. 4b is an alternative design in which each of the three modules has a separate backplane (405s) while the common electrode layer (404) is one piece for all display modules, so is the display panel (401).

FIG. 4c is the top view of the composite display modules of FIGS. 4a and 4b. While the three modules are placed as close to each other as possible on the back support structure or share a common electrode layer and display panel, there are still visible gaps between the single modules. The gaps are due to the cutting tolerance of the backplane. However, the gap between the single modules in this composite display module is significantly narrower than those shown in FIG. 3 where the gap includes the cutting tolerance and the edge sealing. If the width of the cutting tolerance can be reduced, the width of the gap can be further reduced.

Figure 5:
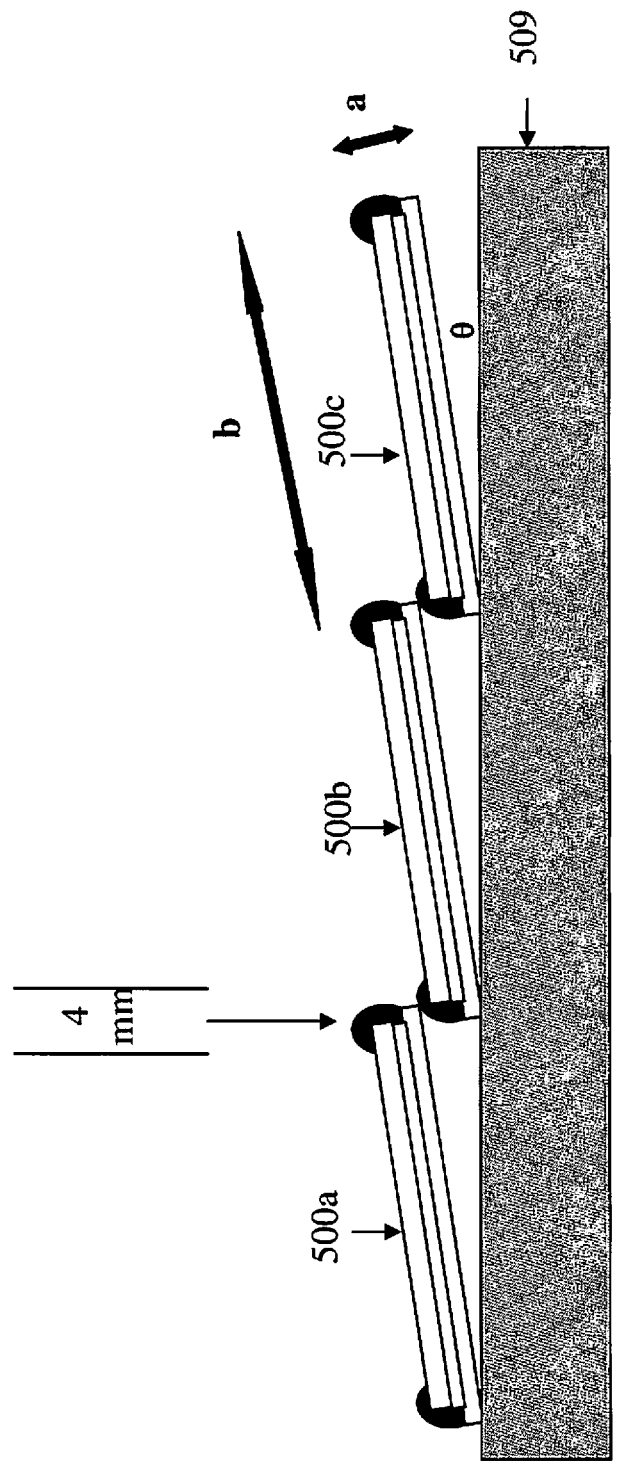
FIG. 5 illustrates an alternative composite display module of the present invention.

FIG. 5 illustrates an alternative composite display module of the present invention. This composite module may be desirable if the manufacturer wishes to use an edge sealing equipment which can only accommodate a smaller size module instead of a large size module formed from more than one single display module pieced together. In this case, the already edge sealed display modules (500a, 500b & 500c) are aligned end to end, but they are somewhat tilted and overlapped, so that the inactive regions seen by the viewer is cut in half (e.g., about 4 mm instead of the 8 mm observed with the butted tiles as shown in FIG. 3). If a thinner inactive edge region on the single display module can be developed, which will, of course, further reduce the width of the inactive regions in the composite display module. As shown in FIG. 5, the three single modules are mounted on top of a back support structure (509) and attached to the support structure for support and alignment. The composite module will show discontinuity in depth. However, the differences in depth would only be equal to the thickness of each individual display module (about 1 mm), which may not be objectionable for a variety of applications.

The size of the angle of tilt (θ) would depend on the thickness (a) and the length (b) of the single display module.

Figure 6:
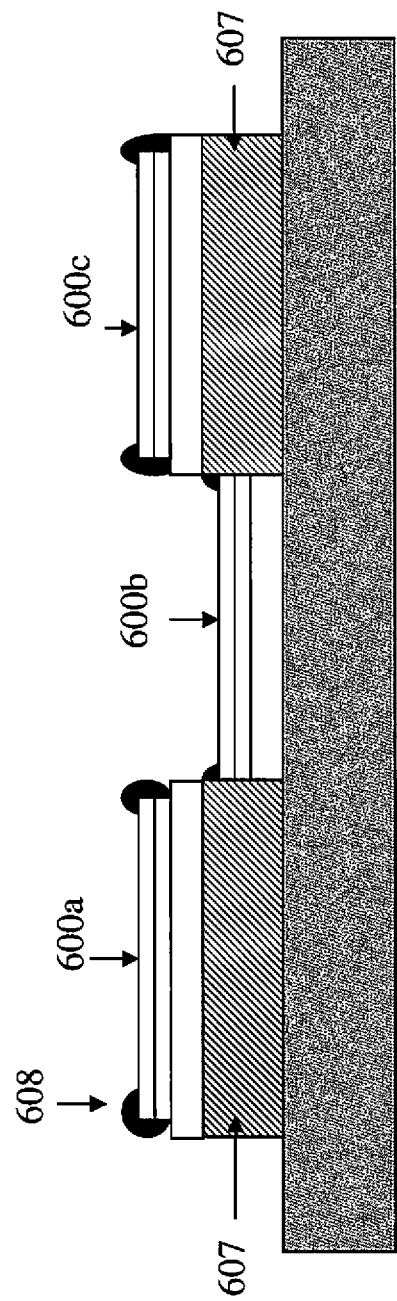
FIG. 6 illustrates a further alternative composite display module of the present invention.

FIG. 6 shows another alternative composite module in which the single display modules are not all on the same level. As shown under modules 600a and 600c, there is an elevation panel 607. The edge sealing areas 608 of the single modules are overlapped, which, like the composite module of FIG. 5, may also reduce the inactive regions to 50% of the inactive regions observed with the prior art method.

Figure 7B:
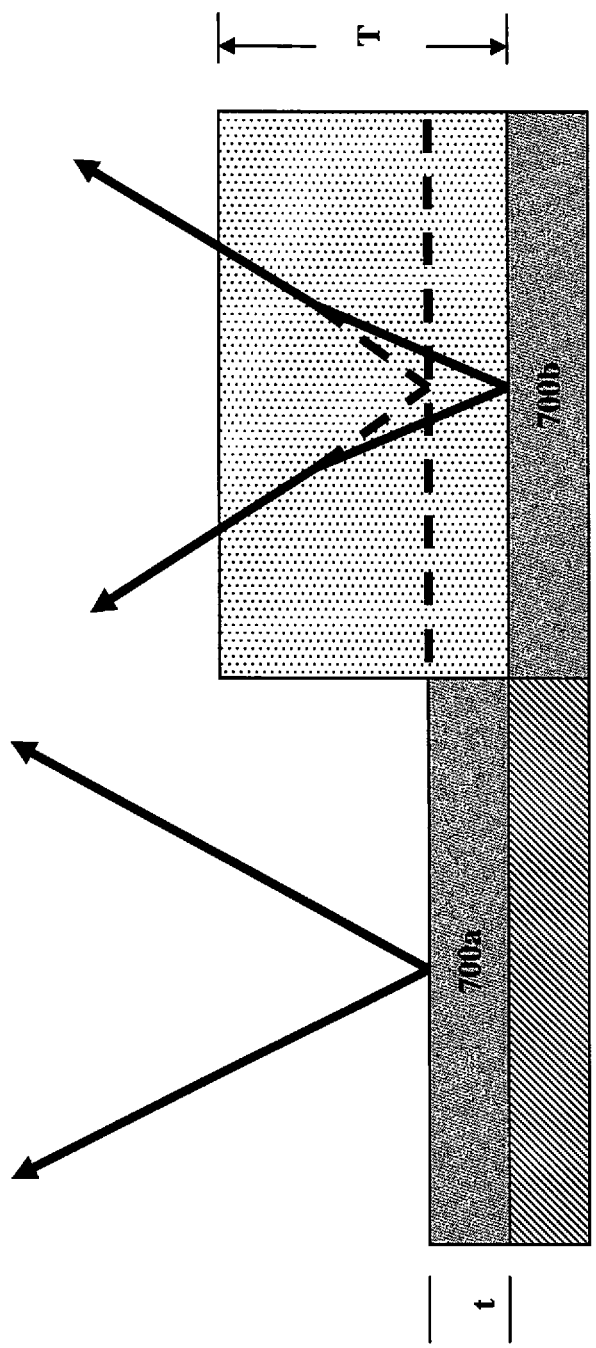

The discontinuity in depth shown in FIG. 6 may be optically corrected by adding an optical compensation window on top of the single display module (600b) which is at a lower level than the rest of the single modules on an elevation panel, as show in FIGS. 7a-7b.

As shown in FIG. 7a, there is an optical compensation window (706) on top of the display module 700b which is lower than the other two modules (700a and 700c), in a cross-section view.

The thickness of the optical compensation window is selected to achieve the effect that all three modules would appear to the viewers to be on the same level visually.

FIG. 7b shows a geometrical drawing of the reflected light seen by the viewers and illustrates how the depth of the display module as viewed by an observer could be made to appear to be of the same depth as module 700a. The optimum thickness (T) of the optical correction window would depend on the thickness of the single display module (t) and the refractive index (n) of the material for the optical compensation window. By small angle approximation, the thickness of the optical compensation window may be calculated based on the following equation:

$$T = t \times [n/(n-1)]$$

For example, if the thickness of the single display module (t) is 1 mm and the refractive index (n) for the material is 1.57, then the optimum thickness (T) of the optical compensation window would be about 2.75 mm.

Suitable material for the optical compensation window preferably has a refractive index as high as possible, but likely to be within the range of about 1.5 and 1.6 for most plastic materials. Such materials may include PMMA [poly(methyl methacrylate)], polycarbonate, glass and the like.

Figure 8B:
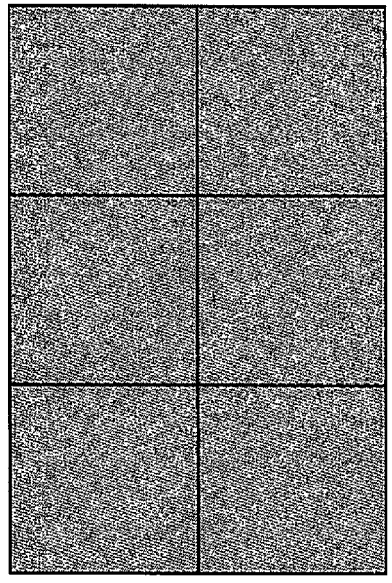
FIGS. 8a-8c illustrate two dimensional designs.
Figure 8A:
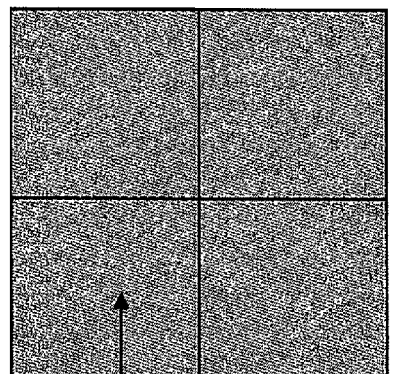
Figure 8C:
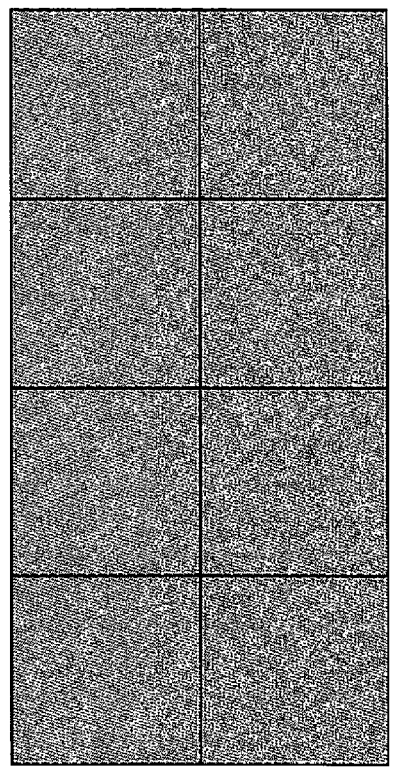

While only a one dimensional design has been specifically mentioned in the application, it is understood that the present invention can be easily adapted for two dimensional designs (see FIGS. 8a-8c).

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A composite display module comprising at least a first single display module which is mounted on an elevation panel and at least a second single display module which is not mounted on an elevation panel, wherein:

i) the first single display module and the second single display module are placed next to each other and they do not overlap;

(ii) each of the first single display module and the second single display module has sealed edges; and (iii) one of the sealed edges of the first single display module and one of the sealed edges of the second single display module are aligned and overlap with each other.

2. The composite display module of claim 1, further comprising an optical compensation window mounted on top of the second single display module.

3. The composite display module of claim 2, wherein each of said first and second single display modules comprises a common electrode layer, a display panel and a backplane.

4. The composite display module of claim 3, wherein said display panel comprises display cells filled with an electrophoretic fluid.

5. The composite display module of claim 2, wherein the optical compensation window has a thickness (T) which is calculated based on the equation:

$$T = t \times [n/(n-1)]$$

wherein t is the thickness of the second single display module and n is the refractive index of a material forming the optical compensation window.

6. The composite display module of claim 2, further comprising a single barrier layer.

7. The composite display module of claim 2, which has a one dimensional design.

8. The composite display module of claim 2, which has a two dimensional design.

\* \* \* \* \*